(No Model.)

J. W. PIVER.
COMPOSITE FLOORING OR CEILING.

No. 598,437. Patented Feb. 1, 1898.

WITNESSES:
M. S. Blondel
Amos W. Hart

INVENTOR
John W. Piver.
BY Munn & Co.
ATTORNEYS.

UNITED STATES PATENT OFFICE.

JOHN W. PIVER, OF PINIA, GEORGIA.

COMPOSITE FLOORING OR CEILING.

SPECIFICATION forming part of Letters Patent No. 598,437, dated February 1, 1898.

Application filed June 18, 1897. Serial No. 641,387. (No model.)

*To all whom it may concern:*

Be it known that I, JOHN W. PIVER, of Pinia, in the county of Dooly and State of Georgia, have invented a new and Improved Composite Flooring or Ceiling, of which the following is a specification.

Composite boards or planks—that is to say, such as are composed of separate strips joined together laterally—are desirable for several reasons, chief of which are ornamental effect, durability, strength, and avoidance of shrinkage. They are ordinarily made of tongued-and-grooved strips arranged so as to present a flat-grain surface on the upper and under sides.

It is the object of my invention to provide a composite board or plank adapted for use in flooring and ceiling and other situations, and which shall be more attractive or ornamental in appearance and also more durable than composite boards or planks ordinarily used and which shall have the same width as the integral board or plank from which it is formed, thus involving no loss or waste of lumber.

To enable my invention to be understood, I will premise that lumber whose grain runs parallel, or nearly so, to its exposed or wearing surface is termed "flat grain," while that whose grain runs at right angles to such surface is known as "edge grain." The latter is superior in ornamental effect, strength, and wearing quality.

Figure 1:
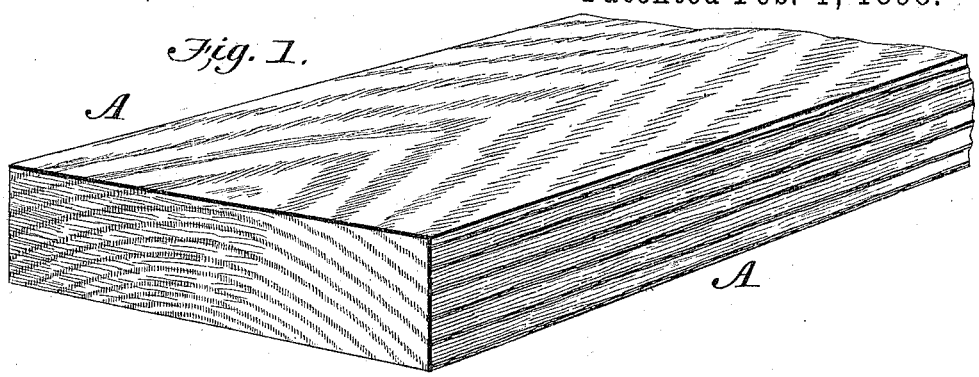
Figure 2:
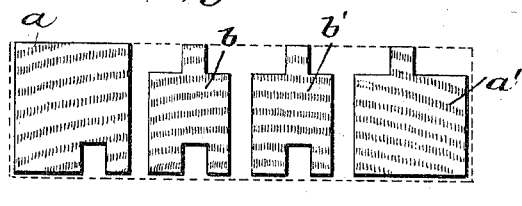
Figure 3:
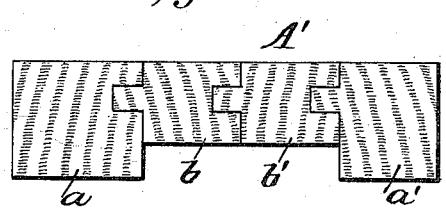
Figure 4:
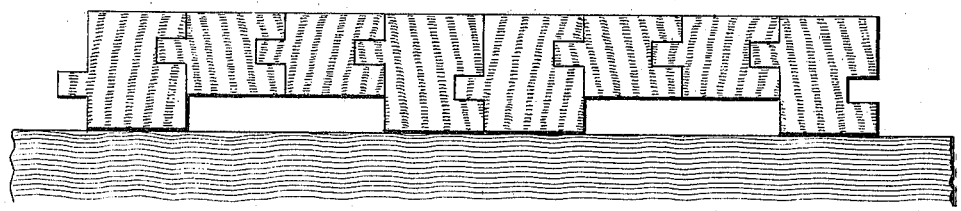
Figure 5:
Figure 6:
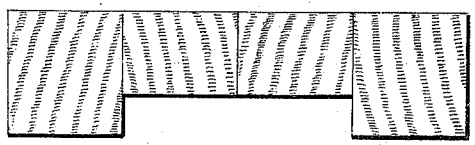

In the accompanying drawings, Figure 1 is an end perspective of a flat-grain board or plank. Fig. 2 is an end view of the several parallel tongued-and-grooved strips into which said board or plank has been converted. Fig. 3 is an end view of the composite edge-grain board or plank produced by joining together the strips shown in Fig. 2. Fig. 4 is a view showing two composite edge-grain planks joined by tongue and groove and resting on a floor-sill. Figs. 5 and 6 illustrate the formation of a composite edge-grain plank whose strips are plain or unprovided with tongue and groove.

In carrying out my invention the flat-grain board or plank A, Fig. 1, is sawed lengthwise into, say, four parallel strips $a\ a'\ b\ b'$, Fig. 2, and suitably tongued and grooved on their upper and under sides to adapt them to be joined together laterally, and thus form the composite board or plank A' shown in Fig. 3—that is to say, the outer strips $a\ a'$ are thicker, Fig. 2, than the inner strips $b\ b'$, and provided, respectively, with a longitudinal groove and tongue on their respective under and upper sides, while the inside strips $b\ b'$ are each provided with a groove in the under side and a tongue on the upper side. As shown in Fig. 2, the strips are arranged as when cut from the integral flat-grain board or plank A—that is to say, with their flat-grain surfaces horizontal; but to enable them to be joined together as shown in Fig. 3 they are turned one-quarter round and then present the edge grain vertically, so that it forms the wearing-surfaces of the composite plank A'.

In sawing the integral plank A into the several strips $a\ a'\ b\ b'$ there is necessarily an absolute waste of a portion of it in the form of sawdust and shavings, and it is apparent that if the planks were sawed into equal-sized strips in the usual way the width of the composite flat-grain plank formed by said strips would necessarily be much less than that of the original integral plank. This is equivalent to saying that in the conversion of integral planks into composite flat-grain planks the absolute waste of lumber is not compensated for; but by sawing the plank A into strips of different size in the manner I propose, and illustrated in Figs. 2 and 3, the waste of lumber in sawdust, &c., is compensated for, since the composite edge-grain plank A' which I produce is of the same width as the original, A, from which it is formed.

In Fig. 2, by means of dotted lines that extend around the strips, I illustrate the end dimensions of the integral plank A, and thereby the loss of lumber caused by sawing and dressing; but by making the inner strips $b\ b'$ narrower than the outer ones $a\ a'$ this waste is taken up and compensated for, and the composite plank A' has the same width as the integral original, A, and also the same thickness, save in the middle portion. The outside strips $a\ a'$ form this rib-like support for the plank A' as a whole, since they alone rest on the floor-sill or sleeper or against studs or other wall-foundation when the plank A' is used for flooring or ceiling. The middle strips $b$ $b'$ are, however, so narrow and so firmly attached to and supported by the outside strips $a$ $a'$ that they do not appreciably yield to ordinary pressure, so that as a whole the plank A' is practically the equal of composite planks of the usual construction.

In Figs. 5 and 6 I show strips having plain sides and joined together without tongue and groove, which may be done by glue or blind-nailing.

I desire it understood, therefore, that, in a broad aspect, my invention includes composite planks having the outside strips thicker than the inside ones and forming the supports for the plank as a whole, whether such plank be of exactly the same width as the original integral one or not. Again, it will be seen that, broadly stated, I produce a composite plank for flooring and ceiling purposes from a plain integral one without loss of material, whatever be the course or arrangement of the grain, but that in the more definite and narrower aspect of the case I produce an edge-grain composite plank from an integral flat-grain plank.

What I claim is—

1. The improved composite edge-grain board, or plank, formed of parallel longitudinal strips, the same being cut from a flat-grain board, or plank, and the outside strips being thicker than the inside ones, whereby, when the several strips are joined together laterally with the edge grain practically at right angles to the wearing-surface, the composite plank has the same width as the original integral one, as shown and described.

2. A composite board or plank formed of a series of strips joined together laterally the outside strips being made thicker than the inside ones and thus projecting on the back of said plank and forming rib-like supports therefor, as shown and described.

JOHN W. PIVER.

Witnesses:
J. A. CALDWELL,
G. O. WAITS.